(12) United States Patent
Su

(10) Patent No.: US 12,352,311 B2
(45) Date of Patent: Jul. 8, 2025

(54) STRUCTURALLY ENHANCED BALL BEARING

(71) Applicant: Yu Min Su, Taiwan (TW)

(72) Inventor: Yu Min Su, Taiwan (TW)

(73) Assignee: Accuratech Automation CO., LTD., Tainan (TW)

( * ) Notice: Subject to any disclaimer, the term of this patent is extended or adjusted under 35 U.S.C. 154(b) by 175 days.

(21) Appl. No.: 18/221,412

(22) Filed: Jul. 13, 2023

(65) Prior Publication Data

US 2023/0358276 A1  Nov. 9, 2023

(51) Int. Cl.
*F16C 33/58* (2006.01)
*F16C 19/06* (2006.01)

(52) U.S. Cl.
CPC ............ *F16C 33/583* (2013.01); *F16C 19/06* (2013.01)

(58) Field of Classification Search
CPC .... F16C 33/583; F16C 33/585; F16C 33/605; F16C 33/7886; F16C 33/7889; F16C 19/06

See application file for complete search history.

(56) References Cited

U.S. PATENT DOCUMENTS

| | | | | |
|---|---|---|---|---|
| 3,578,831 A | * | 5/1971 | Scheifele | F16C 19/364 384/571 |
| 5,454,647 A | * | 10/1995 | Otto | F16C 19/505 277/402 |
| 2003/0008748 A1 | * | 1/2003 | Fox | F16H 1/2836 475/346 |
| 2015/0285307 A1 | * | 10/2015 | Mola | F16C 33/605 384/473 |
| 2017/0114832 A1 | * | 4/2017 | Katsaros | F16C 33/7813 |

FOREIGN PATENT DOCUMENTS

WO   WO-2019020364 A1 * 1/2019

\* cited by examiner

*Primary Examiner* — John Olszewski
*Assistant Examiner* — Aimee Tran Nguyen

(57) ABSTRACT

A ball bearing includes an outer race; an inner race including having a through hole, a first end, and an outer surface; a plurality of balls rotatably disposed between the inner race and the outer race; a washer including an inner surface attached to the outer surface of the inner race; and a welding bead formed at a joining portion of the inner surface of the washer and the first end of the inner race to secure the washer to the inner race. A number of embodiments are provided.

2 Claims, 6 Drawing Sheets

STRUCTURALLY ENHANCED BALL BEARING

BACKGROUND OF THE INVENTION

1. Field of the Invention

The invention relates to ball bearings and more particularly to a structurally enhanced ball bearing.

2. Description of Related Art

A ball bearing is a type of rolling-element bearing that uses balls or cylinders to maintain the separation between an inner race and an outer race. The purpose of a ball bearing is to reduce rotational friction and support radial and axial loads. The ball bearings have many applications.

When the ball bearing is in motion, surfaces of the balls or cylinders must be attached to surfaces of the inner ring or the outer ring. If dust enter and adhere to the surfaces, it will increase friction of the ball bearing and in turn, it may adversely affect the performance of the ball bearing and even cause scratches.

Typically, a washer is provided between the inner and outer rings to prevent dust from entering the bearing. The conventional washer is shaped as a ring which is generally secured to an outer edge of the inner ring or an inner edge of the outer ring by stamping or spot welding. However, the stamping or the spot welding is not durable due to the insufficient strength of the washer. The washer is prone to malfunction and in turn, it adversely affects the dustproof capability and even decreases a useful life of the ball bearing.

Thus, the need for improvement still exists.

SUMMARY OF THE INVENTION

It is therefore one object of the invention to provide a ball bearing, comprising an outer race; an inner race including a through hole, a first end, and an outer surface; a plurality of rotational members rotatably disposed between the inner race and the outer race; a washer including an inner surface attached to the outer surface of the inner race; and a welding bead formed at a joining portion of the inner surface of the washer and the first end of the inner race to fasten the washer and the inner race together.

The invention has the following advantages and benefits in comparison with the conventional art: it can prevent dust from entering the ball bearing, lower coefficient of friction, and increase strength, reliability and durability of the ball bearing, thereby increasing a useful life of the ball bearing.

The above and other objects, features and advantages of the invention will become apparent from the following detailed description taken with the accompanying drawings.

DETAILED DESCRIPTION OF THE INVENTION

Figure 1:
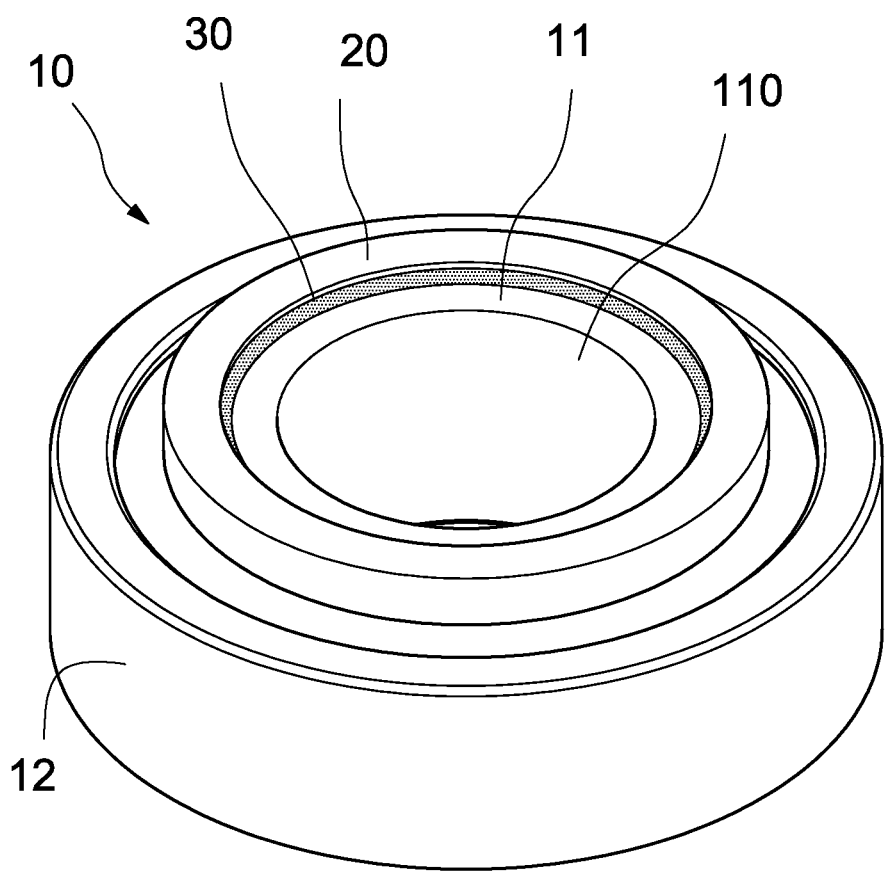
FIG. 1 is a perspective view of a structurally enhanced ball bearing according to a first preferred embodiment of the invention.
Figure 2:
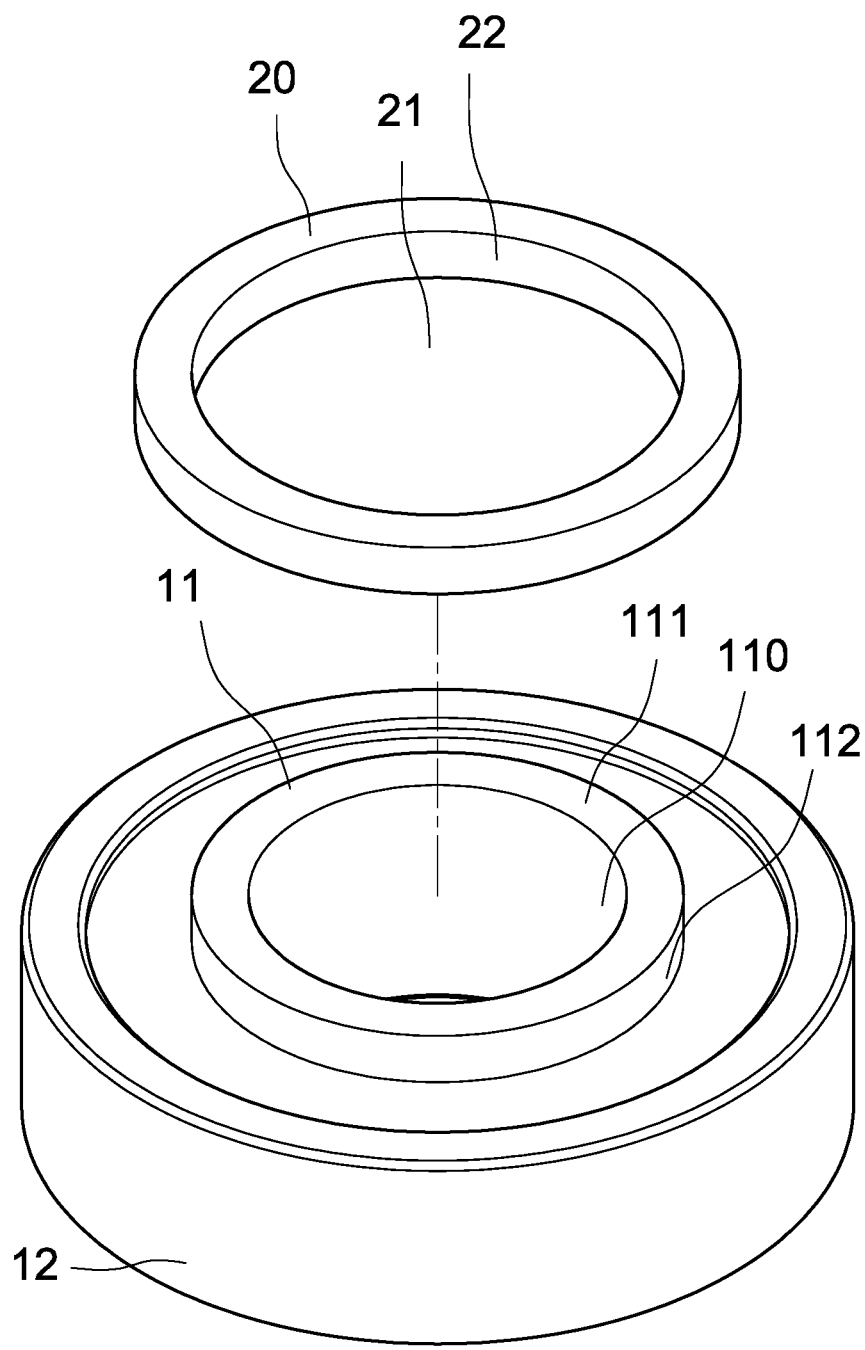
FIG. 2 is an exploded view of the structurally enhanced ball bearing.
Figure 3:
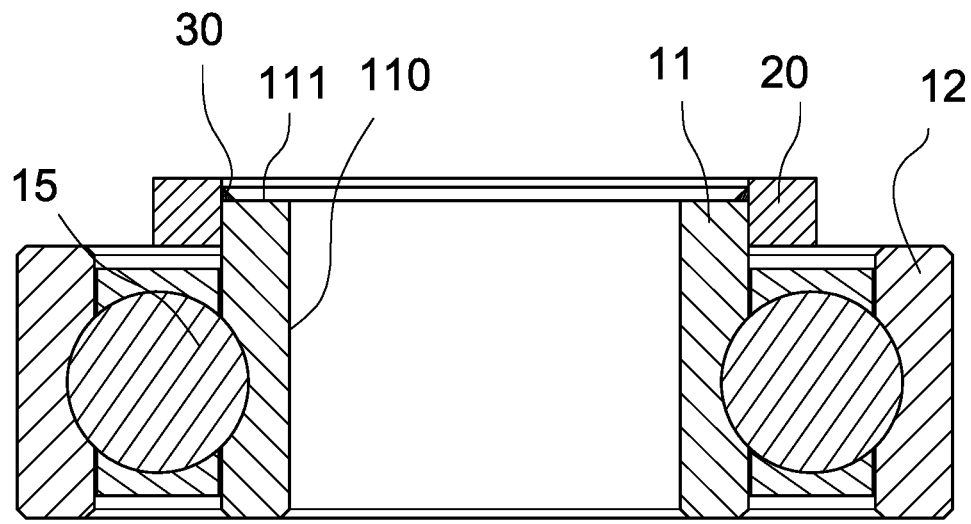
FIG. 3 is a longitudinal sectional view of the structurally enhanced ball bearing.

Referring to FIGS. 1 to 3, a structurally enhanced ball bearing 10 in accordance with a first preferred embodiment of the invention comprises an inner race 11 having a through hole 110 attached to a rotating assembly (e.g., shaft) (not shown) passing through, a first end 111, and an outer surface 112; an outer race 12; a plurality of steel balls (or steel cylinders) 15 rotatably disposed between the inner race 11 and the outer race 12; a washer 20 including a through hole 21 having a diameter equal to an outer diameter of the inner race 11, and an inner surface 22 attached to the outer surface 112 of the inner race 11; and a closed welding bead 30 formed at a joining portion of the inner surface 22 of the washer 20 and the first end 111 of the inner race 11 by laser welding. As a result, the washer 20 and the inner race 11 are secured together.

Figure 4:
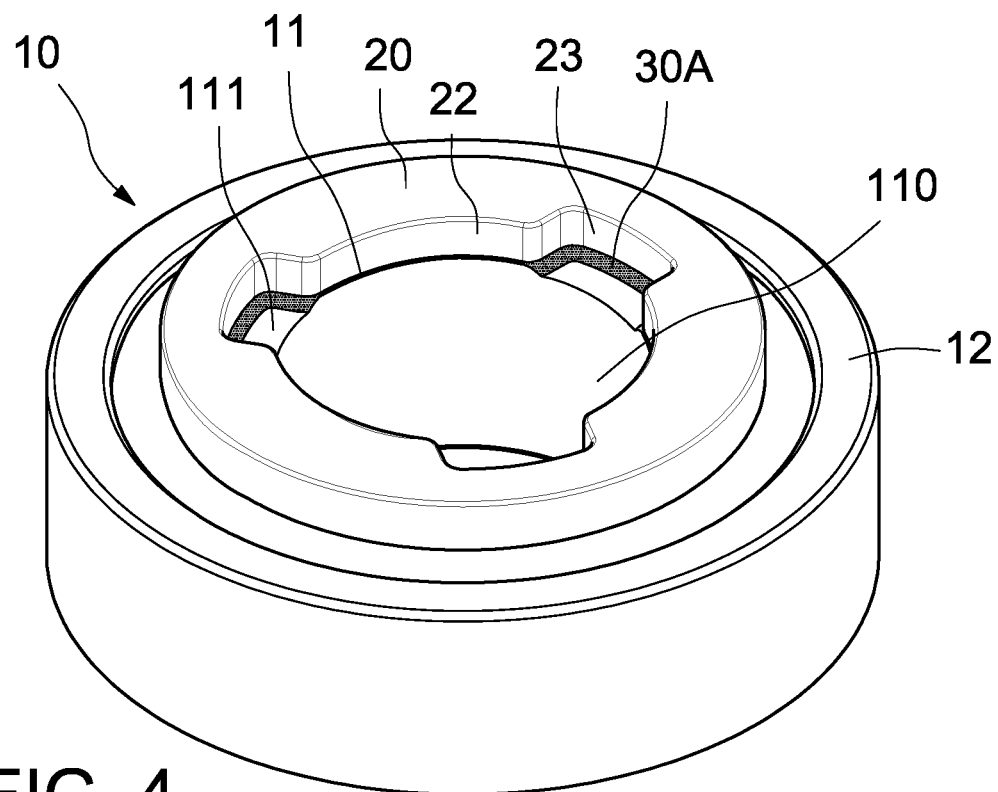
FIG. 4 is a perspective view of a structurally enhanced ball bearing according to a second preferred embodiment of the invention.

Referring to FIG. 4, a structurally enhanced ball bearing in accordance with a second preferred embodiment of the invention is shown. The characteristics of the second preferred embodiment are substantially the same as that of the first preferred embodiment except the following: three equally spaced concave portions 23 are formed on the inner surface 22 of the washer 20; a closed welding bead 30A is formed at each of three joining portions of the concave portions 23 of the washer 20 and the first end 111 of the inner race 11 by laser welding.

Figure 5:
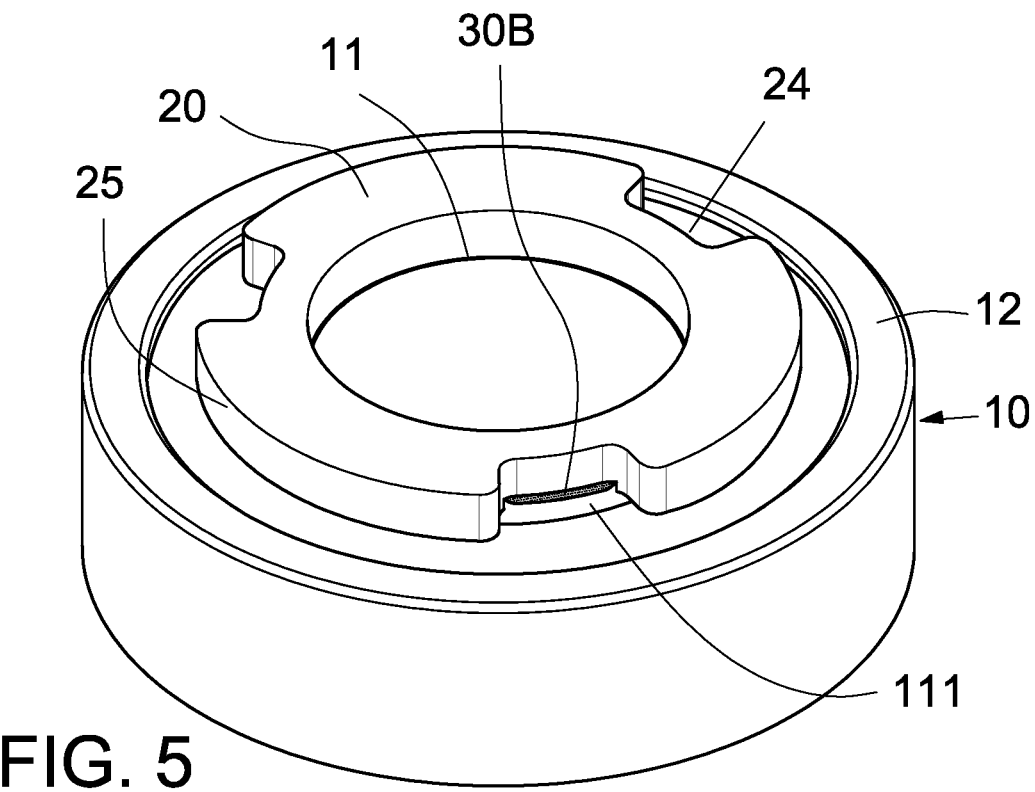
FIG. 5 is a perspective view of a structurally enhanced ball bearing according to a third preferred embodiment of the invention.

Referring to FIG. 5, a structurally enhanced ball bearing in accordance with a third preferred embodiment of the invention is shown. The characteristics of the third preferred embodiment are substantially the same as that of the first preferred embodiment except the following: three equally spaced concave portions 24 are formed on an outer surface 25 of the washer 20; a closed welding bead 30B is formed at each of three joining portions of the concave portions 24 of the washer 20 and the first end 111 of the inner race 11 by laser welding.

Figure 6:
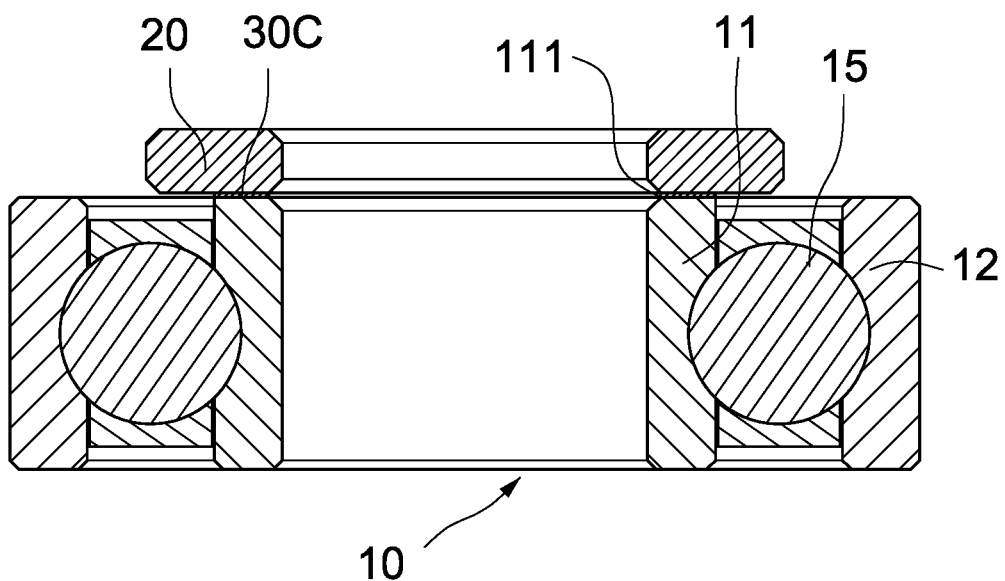
FIG. 6 is a longitudinal sectional view of a structurally enhanced ball bearing according to a fourth preferred embodiment of the invention.

Referring to FIG. 6, a structurally enhanced ball bearing in accordance with a fourth preferred embodiment of the invention is shown. The characteristics of the fourth preferred embodiment are substantially the same as that of the first preferred embodiment except the following: an inner diameter of the washer 20 is equal to that of the inner race 11; the washer 20 is disposed on the first end 111 of the inner race 11; and a closed welding bead 30C is formed at a joining portion of a bottom of the washer 20 and the first end 111 of the inner race 11 by laser welding.

Figure 7:
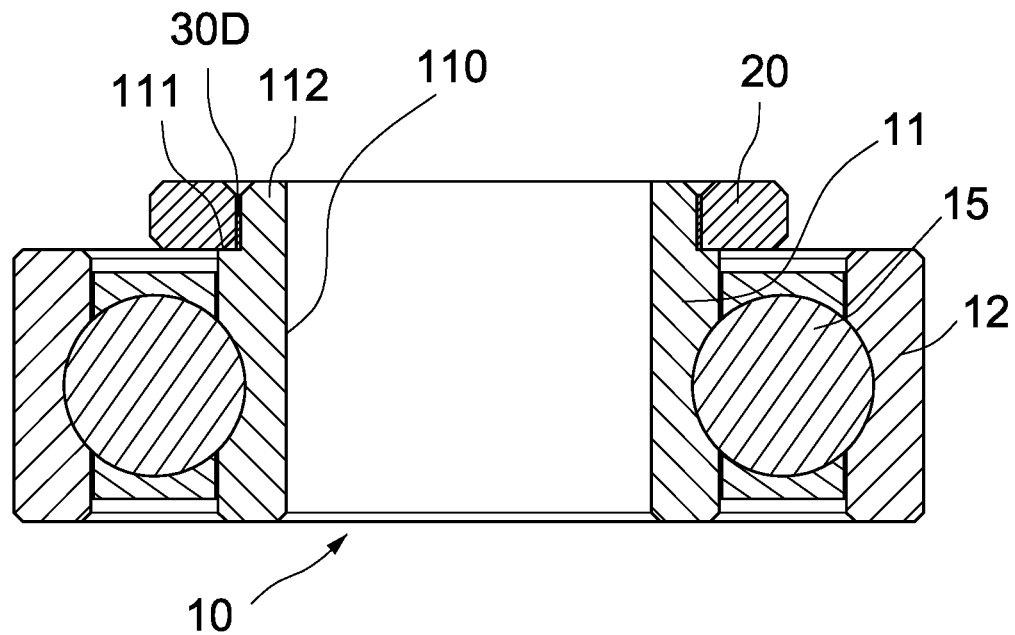
FIG. 7 is a longitudinal sectional view of a structurally enhanced ball bearing according to a fifth preferred embodiment of the invention.

Referring to FIG. 7, a structurally enhanced ball bearing in accordance with a fifth preferred embodiment of the invention is shown. The characteristics of the fifth preferred embodiment are substantially the same as that of the first preferred embodiment except the following: a first end of the washer 20 is flush with the first end 111 of the inner race 11; and a closed welding bead 30D is formed at a joining portion of the inner surface 22 of the washer 20 and an outer surface of an annular flange 112 on the first end 111 of the inner race 11 by laser welding.

Figure 8:
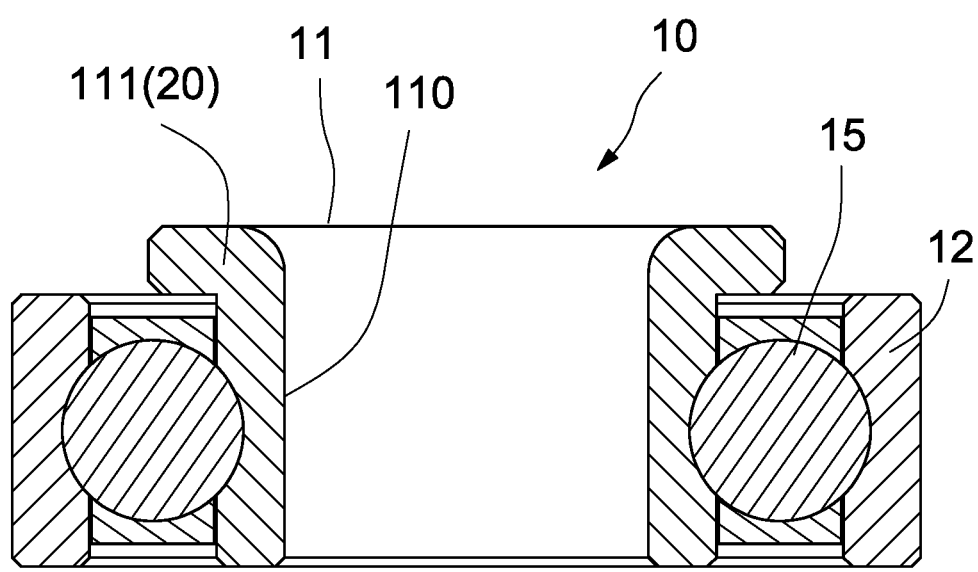
FIG. 8 is a longitudinal sectional view of a structurally enhanced ball bearing according to a sixth preferred embodiment of the invention.

Referring to FIG. 8, a structurally enhanced ball bearing in accordance with a sixth preferred embodiment of the invention is shown. The characteristics of the sixth preferred embodiment are substantially the same as that of the first preferred embodiment except the following: the washer 20 and the first end 111 of the inner race 11 are integrally formed together.

Figure 9:
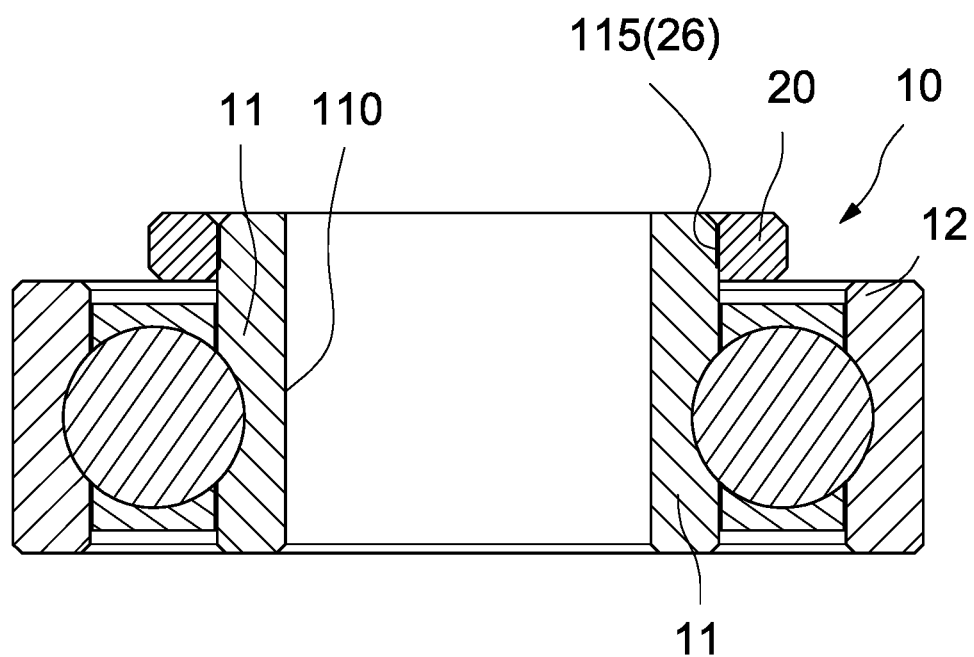
FIG. 9 is a longitudinal sectional view of a structurally enhanced ball bearing according to a seventh preferred embodiment of the invention.

Referring to FIG. 9, a structurally enhanced ball bearing in accordance with a seventh preferred embodiment of the invention is shown. The characteristics of the seventh preferred embodiment are substantially the same as that of the first preferred embodiment except the following: a first end of the washer 20 is flush with the first end 111 of the inner race 11; the washer 20 includes an annular projection 26 on the inner surface; and the inner race 11 includes an annular recess 115 adjacent to the first end 111, the annular recess 115 being secured to the complementary annular projection 26.

It is noted that an axial thickness of the washer 20 can be increased if additional structural strength and other advantages are desired.

The invention has the following advantages and benefits in comparison with the conventional art: it can prevent dust from entering the ball bearing 10, lower coefficient of friction, and increase strength, reliability and durability of the ball bearing 10, thereby increasing a useful life of the ball bearing 10.

While the invention has been described in terms of preferred embodiments, those skilled in the art will recognize that the invention can be practiced with modifications within the spirit and scope of the appended claims.

What is claimed is:

1. A ball bearing, comprising:
an outer race;
an inner race including a through hole, a first end, and an outer surface;
a plurality of rotational members rotatably disposed between the inner race and the outer race;
a washer including an inner surface attached to the outer surface of the inner race; and
a welding bead formed at a joining portion of the inner surface of the washer and the first end of the inner race to fasten the washer and the inner race together;
wherein the washer further comprises a through hole having a diameter equal to that of the through hole of the inner race, and a plurality of equally spaced concave portions on the inner surface so that the welding bead is formed at each of a plurality of joining portions of the concave portions and the first end of the inner race.

2. A ball bearing, comprising:
an outer race;
an inner race including a through hole, a first end, and an outer surface;
a plurality of rotational members rotatably disposed between the inner race and the outer race;
a washer including an inner surface attached to the outer surface of the inner race; and
a welding bead formed at a joining portion of the inner surface of the washer and the first end of the inner race to fasten the washer and the inner race together;
wherein the washer further comprises a through hole having a diameter equal to that of the through hole of the inner race, and a plurality of equally spaced concave portions on an outer surface so that the welding bead is formed at each of a plurality of joining portions of the concave portions and the first end of the inner race.

* * * * *